(12) United States Patent
Ohba

(10) Patent No.: US 7,150,503 B2
(45) Date of Patent: Dec. 19, 2006

(54) AUTOMOTIVE SEAT RECLINING DEVICE

(75) Inventor: Tetsuya Ohba, Shizuoka (JP)

(73) Assignee: Fuji Kiko Co., Ltd., Kosai (JP)

( * ) Notice: Subject to any disclaimer, the term of this patent is extended or adjusted under 35 U.S.C. 154(b) by 0 days.

(21) Appl. No.: 11/369,838

(22) Filed: Mar. 8, 2006

(65) Prior Publication Data
US 2006/0202538 A1    Sep. 14, 2006

(30) Foreign Application Priority Data
Mar. 9, 2005 (JP) ............... 2005-064743

(51) Int. Cl.
*B60N 2/235* (2006.01)
(52) U.S. Cl. .................................. 297/367
(58) Field of Classification Search ........... 297/367
See application file for complete search history.

(56) References Cited

U.S. PATENT DOCUMENTS

| | | | | |
|---|---|---|---|---|
| 4,143,905 A | * | 3/1979 | Hensel et al. | 297/362.12 |
| 5,590,931 A | * | 1/1997 | Fourrey et al. | 297/367 |
| 6,085,386 A | * | 7/2000 | Blanchard et al. | 297/367 |
| 6,312,053 B1 | * | 11/2001 | Magyar | 297/367 |
| 6,648,414 B1 | * | 11/2003 | Ikegaya et al. | 297/367 |
| 6,666,515 B1 | * | 12/2003 | Asano et al. | 297/366 |
| 6,688,695 B1 | | 2/2004 | Pleskot | |
| 6,854,802 B1 | * | 2/2005 | Matsuura et al. | 297/367 |
| 6,908,156 B1 | * | 6/2005 | Park et al. | 297/367 |

FOREIGN PATENT DOCUMENTS

| | | |
|---|---|---|
| EP | 1 225 086 A1 | 7/2002 |
| JP | 2002-177083 A | 6/2002 |
| JP | 2002-345588 A | 12/2002 |
| JP | 2004-121508 A | 4/2004 |

OTHER PUBLICATIONS

U.S. Appl. NO. 11/369,941, filed Mar. 8, 2006, Ohba.

* cited by examiner

*Primary Examiner*—Peter R. Brown
(74) *Attorney, Agent, or Firm*—Foley & Lardner LLP

(57) ABSTRACT

An automotive seat reclining device includes a base member coupled to one of a seat cushion and a seat back, a pivot member coupled to the other of the seat cushion and the seat back and having gear teeth, a shaft member formed integrally with the base member and having a cylindrical shaft surface, a lock member having first and second opposite end surfaces and lock teeth formed in the second end surface, a cam member for moving the lock member to engage the lock teeth with the gear teeth and disengage the lock teeth from the gear teeth, first and second guide members formed integrally with the base member to guide the lock member along a path around the shaft member and a stress absorbing protrusion formed integrally with the shaft surface on an opposite side of the shaft member from the lock teeth.

9 Claims, 3 Drawing Sheets

AUTOMOTIVE SEAT RECLINING DEVICE

BACKGROUND OF THE INVENTION

The present invention relates to an automotive seat reclining device capable of holding a seat back tightly at a desired angle with respect to a seat cushion even when a large load is applied to the seat back.

In recent years, it has become common practice for an automotive vehicle to use a seat back as a seat belt anchor although a vehicle center pillar is conventionally used as a seat belt anchor. When the seat back is used as the belt anchor, the inertia of a vehicle passenger is exerted onto the seat back in a direction that tilts the seat back toward the front or rear side in a vehicle collision so that the seat back receives a load much larger than conventionally assumed. An automotive seat reclining devices is thus required to be able to lock the seat back in position even in such a case.

SUMMARY OF THE INVENTION

One type of automotive seat reclining device employs a pair of first and second toothed members: the first toothed member is coupled to the seat back and the second toothed member is swingably supported by a shaft member to lock the seat back upon engagement of these toothed members as proposed in Japanese Laid-Open Patent Publication No. 2004-121508. In the above-proposed type of seat reclining device, a large load on the seat back is transmitted from the first toothed member to the second lock member through their tooth engagement so as to force a shaft bearing portion of the second toothed member onto the shaft member. The shaft bearing portion of the second toothed member is subjected to bending stress by a reaction force from the shaft member, thereby causing a rupture of the shaft bearing portion to maintain the engagement between the first and second toothed members. However, the seat reclining device varies in strength due to the instability of rupture load. There arises a difficulty in improving the strength of the seat reclining device.

It is therefore an object of the present invention to provide an automotive seat reclining device of the above-proposed type, which is capable of locking a seat back in position even when a large load is applied to the seat back.

According to one aspect of the present invention, there is provided an automotive seat reclining device for holding a seat back at a desired angle with respect to a seat cushion, comprising: a base member coupled to one of the seat cushion and the seat back; a pivot member coupled to the other of the seat cushion and the seat back, being pivotable relative to the base member and having gear teeth; a shaft member integrally formed with the base member; a lock member being swingable around the shaft member and having a shaft bearing surface and lock teeth engageable with the gear teeth; a cam member for causing the lock member to swing along an arc path around the shaft member in a direction that brings the lock teeth into engagement with the gear teeth to prevent a pivotal movement of the pivot member relative to the base member and in a direction that disengages the lock teeth from the gear teeth to allow a pivotal movement of the pivot member relative to the base member; and first and second guide members formed integrally with the base member at locations adjacent to respective ends of the swing path of the lock member so as to guide the lock member along the swing path and, under the application of a load that forces the pivot member to pivot relative to the base member, support the lock member by the shaft member and the second guide member, wherein the shaft member has a shaft surface facing the shaft bearing surface of the lock member and including a pair of shaft surface sections to guide the lock member along the swing path and a stress absorbing protrusion formed integrally with one of the shaft surface sections located on an opposite side of the shaft member from the lock teeth.

According to another aspect of the present invention, there is provided an automotive seat reclining device for holding a seat back at a desired angle with respect to a seat cushion, comprising: a base member coupled to one of the seat cushion and the seat back; a pivot member coupled to the other of the seat cushion and the seat back, being pivotable relative to the base member and having gear teeth; a shaft member formed integrally with the base member and having a cylindrical shaft surface; a lock member being swingable along a path around the shaft member and having a shaft bearing surface facing the shaft surface, a pair of first and second opposite end surfaces positioned on the swing path of the lock member and lock teeth formed in the second end surface to be engageable with the gear teeth; a cam member for causing the lock member to swing along the path around the shaft member in a direction that brings the lock teeth into engagement with the gear teeth to prevent a pivotal movement of the pivot member relative to the base member and in a direction that disengages the lock teeth from the gear teeth to allow a pivotal movement of the pivot member relative to the base member; first and second guide members formed integrally with the base member at locations adjacent to the first and second end surfaces of the lock member, respectively, so as to guide the lock member along the path around the shaft member; and a stress absorbing protrusion formed integrally with the shaft surface on an opposite side of the shaft member from the lock teeth.

The other objects and features of the present invention will also become understood from the following description.

DESCRIPTION OF THE EMBODIMENTS

The present invention will be described below with reference to the drawings.

Figure 1:
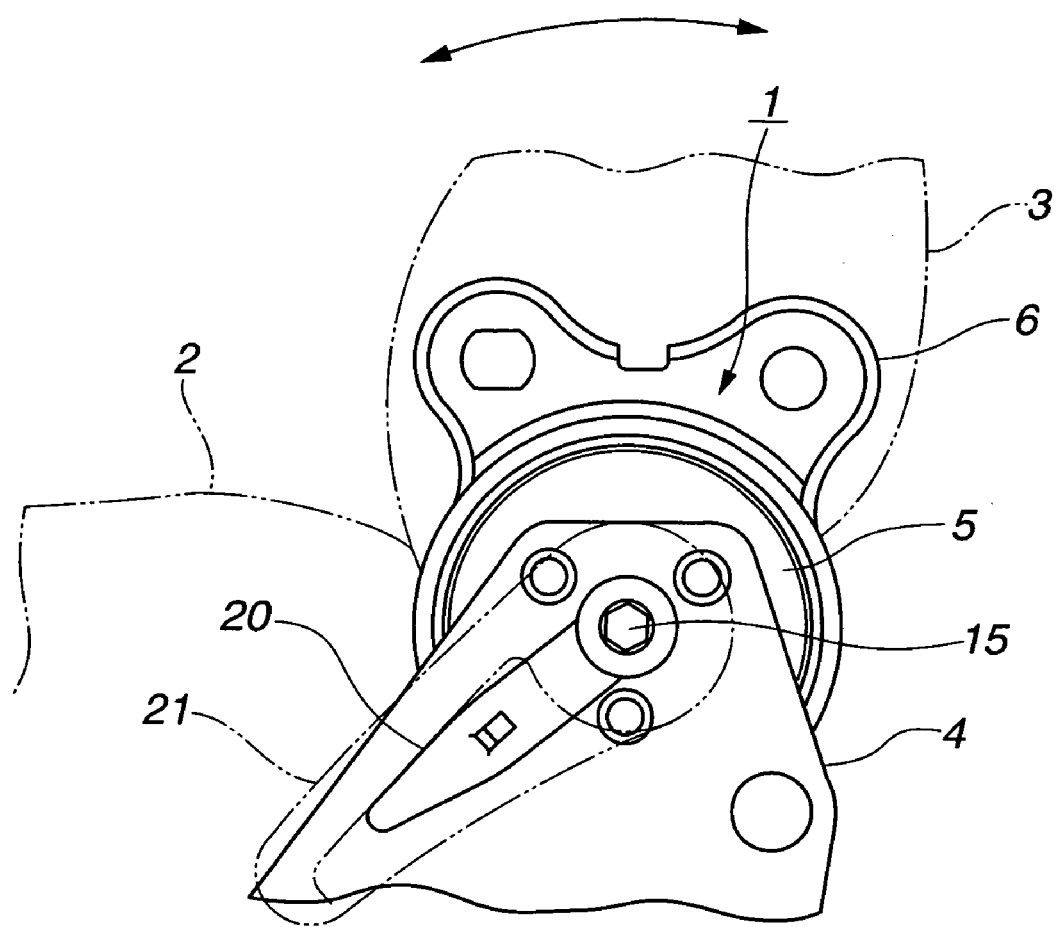
FIG. 1 is a side view of an automotive seat reclining device according to one exemplary embodiment of the present invention.

In an automotive vehicle in which the present invention is embodied, two seat reclining devices 1 are mounted on the left and right sides of a passenger seat so that a seat back 3 is pivotally attached to a seat cushion through the seat reclining devices 1 although only the left-side seat reclining device 1 is shown in FIG. 1. The left- and right-side seat reclining devices 1 have respective operation shafts 15 connected via a cylindrical connection shaft 16, as shown in FIGS. 1 and 2B, so as to operate in synchronism with each other. In the present embodiment, these two seat reclining devices 1 are similar (generally symmetrical) in structure to each other. A detailed explanation will be thus given below of the left-side seat reclining device 1 (hereinafter just referred to as "the seat reclining device 1").

Figure 2A:
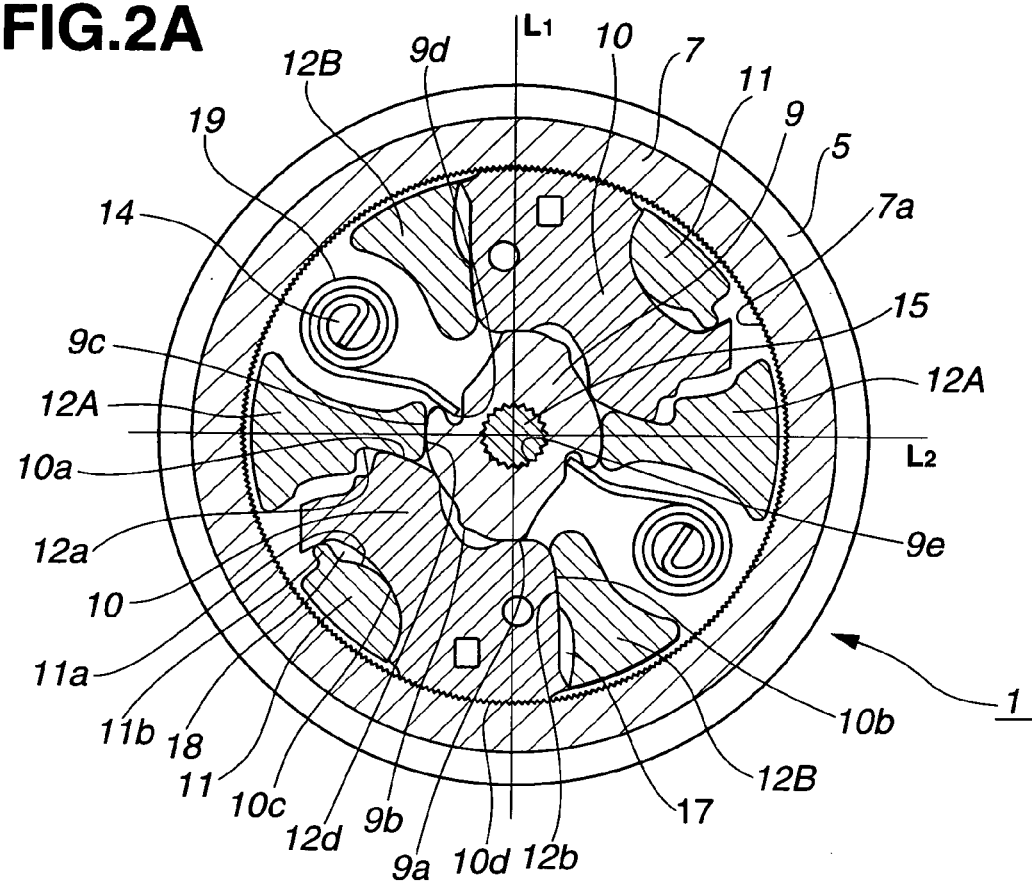
FIG. 2A is a cross section view of the seat reclining device of FIG. 1, when holding a seat back at a desired angle with respect to a seat cushion under usual conditions.
Figure 2B:
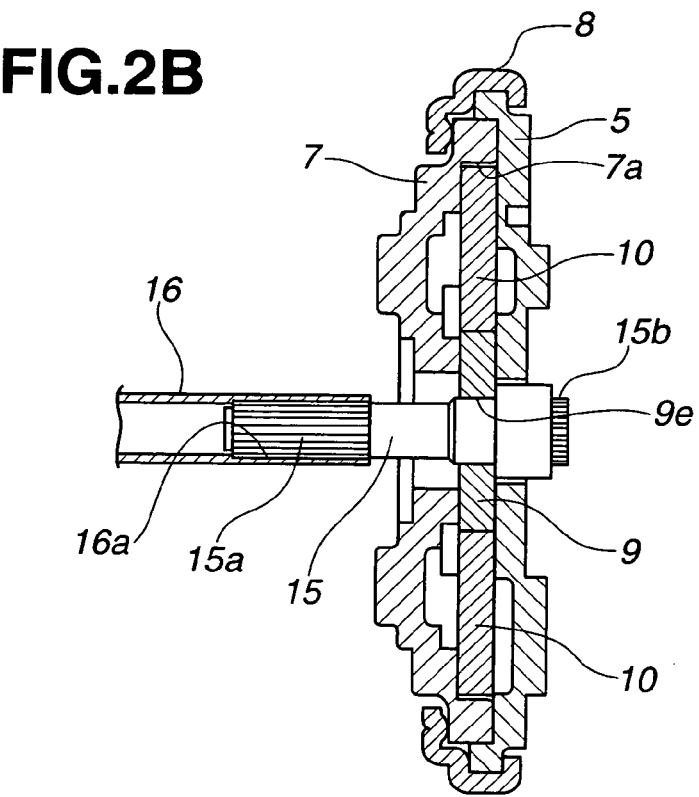
FIG. 2B is a longitudinal section view of the seat reclining device of FIG. 1.

As shown in FIGS. 1, 2A and 2B, the seat reclining device 1 includes a base member 5 (as a device frame) coupled to one of the seat cushion 2 and the seat back 3 via a base plate 4, a pivot member 7 (as a device cover) coupled to the other of the seat cushion 2 and the seat back 3 via an arm plate 6 and a spring for applying a spring tension that biases the seat back 3 toward the vehicle front side, i.e., the left side in FIG. 1 relative to the seat cushion 2. In the present embodiment, the base member 5 and the pivot member 7 are coupled to the seat cushion 2 and the seat back 3, respectively.

The base member 5 is formed into a bottomed cylindrical shape by subjecting a disc material to half die-press working. Semicylindrical protrusions 14 are formed integrally with the base member 5. The pivot member 7 is also formed into a bottomed cylindrical shape by subjecting a disc material to half die-press working and then is coaxially and pivotally fitted in the base member 5. Further, the pivot member 7 has gear teeth 7a cut in an inner cylindrical surface thereof.

The base member 5 and the pivot member 7 are held together at peripheries thereof by a ring-shaped holder 8 so as to prevent the base member 5 and the pivot member 7 from being axially separated from each other but allow the pivot member 7 to pivot circumferentially relative to the base member 5.

The seat reclining device 1 also includes a rotary cam member 9, a pair of lock members 10, shaft members 11, guide protrusions 12A and 12B (as guide members) and lock springs 19 as shown in FIGS. 1, 2A and 2B.

The cam member 9 is formed with a center hole 9e and disposed coaxially and rotatably between the base member 5 and the pivot member 7, whereas the lock members 10 are swingably disposed between the base member 5 and the pivot member 7 at upper and lower sides of the cam member 9. The shaft members 11 and the guide protrusions 12A and 12B are integrally formed with the base member 5 so as to guide the lock members 10 to swing along arcs around the shaft members 11.

Each of the lock members 10 has opposite first and second end surfaces positioned on its swing path, lock teeth 10d cut in the second end surface facing the pivot member 7, a shaft bearing surface 10c for supporting thereon the shaft member 11 and sliding surfaces 10a and 10b for supporting thereon the guide protrusions 12A and 12B, respectively. The shaft bearing surface 10c of the lock member 10 is herein formed by making a substantially cylindrical cut in the lock member 10.

On the other hand, the cam member 9 has a pair of first cam surfaces 9a for causing the lock members 10 to swing along the respective paths around the shaft members 11 in a direction that brings the lock teeth 10d into engagement with the gear teeth 7a by a rotation of the cam member 9 in a counterclockwise direction in FIG. 2A about the center hole 9e, a pair of second cam surfaces 9b for causing the lock members 10 to swing along the respective paths around the shaft members 11 in a direction that disengages the lock teeth 10d from the gear teeth 7a by a rotation of the cam member 9 in a clockwise direction in FIG. 2A about the center hole 9e and a pair of sliding surfaces 9c located on a line L2 substantially perpendicular to a line L1 through the first cam surfaces 9a and held in sliding contact with a portion 12d of the guide protrusions 12A to restrict a displacement of the cam member 9 in a direction of the line L2. Herein, the sliding surfaces 9c of the cam member 9 are formed into circular arcs about the center hole 9e.

Spring engagement recesses 9d are formed in a peripheral surface of the cam member 9, and each of the lock springs 19 has one end fixed to the protrusion 14 and the other end fixed to the spring engagement portion 9d of the cam member 9 so as to apply a spring tension that biases the cam member 9 in the counterclockwise direction in FIG. 2A all the time.

The shaft members 11 are positioned at inner radius sides of the swing paths of the lock members 10 and have cylindrical shaft surfaces 11a facing the lock members 10 to guide the lock members 10 along the swing paths from their inner radius sides, respectively.

In the present embodiment, each of the shaft surfaces 11a of the shaft members 11 includes two surface sections for sliding contact with the shaft bearing surface 10c of the lock member 10c. These two shaft surface sections are located on the circumferentially opposite sides of the shaft surface 11a in the direction of pivotal movement of the pivot member 7. Hereinafter, one of the shaft surface sections located on the opposite side of the shaft member 11 from the lock teeth 10d (i.e. farther from the lock teeth 10d) is referred to as a "first shaft surface section", and the other of the shaft surfaces located nearer to the lock teeth 10d is referred to as a "second shaft surface section".

For the purpose of stress absorption, the shaft members 11 have protrusions 11b formed integrally with the first shaft surface sections of the shaft surfaces 11a, respectively. Each of the stress absorbing protrusions 11b has an end for sliding contact with a section of the shaft bearing surface 10c of the lock member 10.

In order for the lock member 10 to swing along the arc around the shaft member 11, both of the end of the stress absorbing protrusion 11b and the protrusion contact section of the shaft bearing surface 10c of the lock member 10 are herein formed into circular arcs about the center of the shaft member 11.

There is a gap 18 left between each pair of the shaft bearing surface 10c of the lock member 10 and the shaft surface 11a of the shaft member 11 at a location on between the first and second shaft surface sections, notably between the stress absorbing protrusion 11b and the second shaft surface section, such that the gap 18 becomes wider as the distance from the protrusion 11b decreases.

The guide protrusions 12A and 12B are positioned adjacent to respective ends of the swing paths of the lock members 10 on the outer radius sides of the swing paths, i.e., adjacent to the first and second end surfaces of the lock members 10 so as to hold the lock members 10 between the shaft members 11 and the guide protrusions 12B, respectively, under the application of a load in a direction that forces the pivot member 7 to pivot relative to the base member 5. Further, the guide protrusions 12A and 12B have guide surfaces 12a and 12b facing the lock members 10 to make sliding contact with the sliding surfaces 10a and 10b of the lock members 10, respectively, to guide the lock members 10 along the swing arcs from their outer radius sides.

In order for the lock member 10 to swing around the shaft member 11 over the guide protrusions 12A and 12B, the sliding surfaces 10a and 10b of the lock member 10 and the guide surfaces 12a and 12b of the guide protrusions 12A and 12B are herein formed into circular arcs about the center of the shaft member 11.

There is also a gap 17 left between portions of the lock member 10 and the guide protrusion 12B facing each other at a location adjacent to the gear teeth 7a.

The operation shaft 15 is press-fitted through the center hole 9e of the cam member 9 and has one serrated end 15a coupled to a serrated end 16a of the connection shaft 16 and the other serrated end 15b protruding outwardly through the base plate 4. An operation lever 20 with an operation knob 21 is attached to the end 15b of the operation shaft 15.

The above-structured seat reclining device 1 operates as follows.

In usual times, the cam member 9 is biased in the counterclockwise direction in FIG. 2A under a tension by the lock springs 19 so as to press the cam surfaces 9a against the lock members 10a, respectively. The lock members 10 are guided by the shaft members 11 and the guide protrusions 12A and 12B in the direction (the clockwise direction in FIG. 2A) to hold the lock teeth 10d in engagement with the gear teeth 7a. The pivotal movement of the pivot member 7 relative to the base member 5 is prevented by engagement of the gear teeth 7a and the lock teeth 10d. In other words, the seat reclining device 1 is held in a locked state where the seat back 3 is locked in position. At this time, each of the lock members 10 comes into contact with the shaft member 11 at two areas: the end of the stress absorbing protrusion 11b and the second shaft surface section of the shaft surface 11a. This makes it possible to decrease the amount of circumferential clearance of the pivot member 7 and reduce the occurrence of backlash of the pivot member 7.

When the operation knob 21 is turned by a passenger to rotate the operation shaft 15 in a clockwise direction in FIG. 1, the cam member 9 rotates about the center hole 9e in the clockwise direction in FIG. 2A against the tension of the lock springs 19 so as to release the first cam surfaces 9a from the lock members 10 but press the second cam surfaces 9b against the lock members 10, respectively. The lock members 10 are guided by the shaft members 11 and the guide protrusions 12A and 12B in the direction (the counterclockwise direction of FIG. 2A) that disengages the lock teeth 10d from the gear teeth 7a so as to allow a pivotal movement of the pivot member 7 relative to the base member 5. The seat reclining device 1 is shifted in a lock release state where the seat back 3 can tilts to a desired angle position together with the arm plate 6 and the pivot member 7 under spring tension.

The operation knob 21 is released when the seat back 3 is adjusted to a desired angle with respect to the seat cushion 2. Then, the cam member 9 rotates about the center hole 9e in the counterclockwise direction in FIG. 2A under the tension of the lock springs 19 to press the cam surfaces 9a against the lock members 10. The lock members 10 are guided by the shaft members 11 and the guide protrusions 12A and 12B in the direction (the clockwise direction of FIG. 2A) that brings the lock teeth 10d in engagement with the gear teeth 7a so as to prevent a pivotal movement of the pivot member 7 relative to the base member 5. The seat reclining device 1 is returned to the locked state upon engagement of the gear teeth 7a and the lock teeth 10d.

It is now assumed that a load is applied to the seat back 3 in a direction that tilts the seat back 3 toward the vehicle rear side when the seat reclining device 1 are in the locked state.

Figure 3:
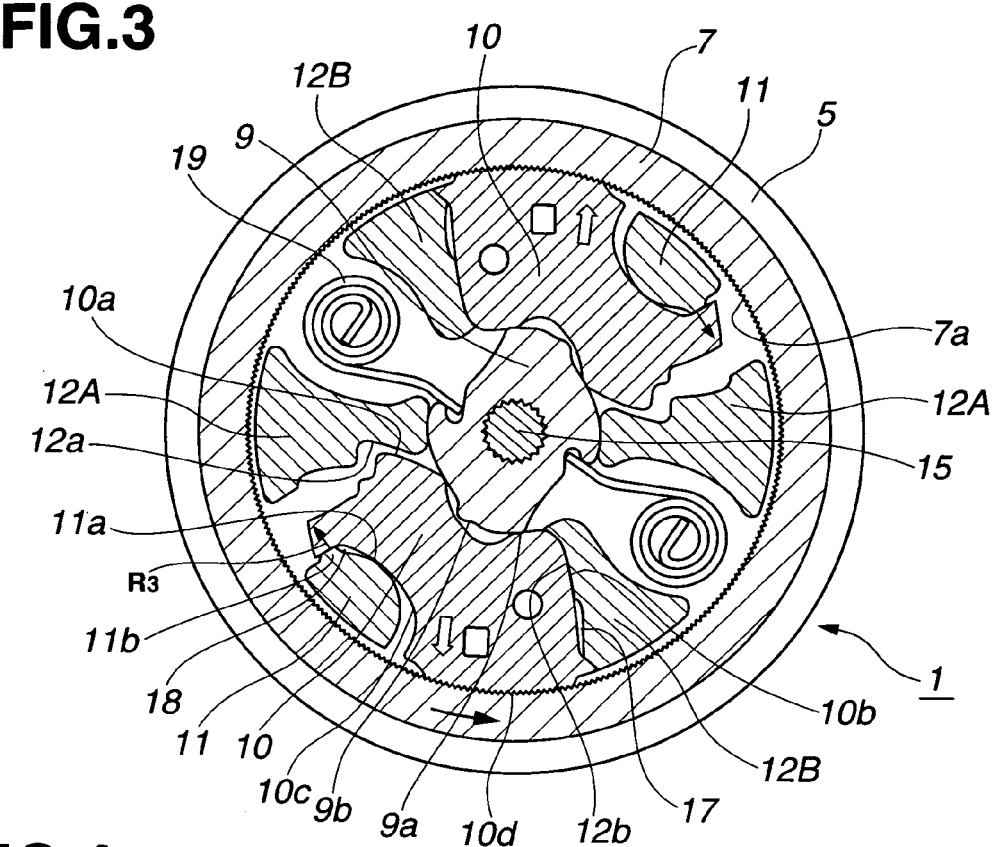
FIG. 3 is a cross section view of the seat reclining device of FIG. 1, when a large rearward load is applied to the seat back.

Under the application of such a rearward load to the seat back 3, the pivot member 7 is forced in a counterclockwise direction in FIG. 3 relative to the base member 5. The pivotal force of the pivot member 7 is transmitted to the lock members 10 through the engagement of the gear teeth 7a and the lock teeth 10a, thereby forcing the lock members 10 in a counterclockwise direction in FIG. 3. Then, the lock members 10 are supported by the cam surfaces 9a of the cam member 9, the shaft surfaces 11a of the shaft members 11 and the guide surfaces 12b of the guide protrusions 12B.

There arises a bending moment, in the presence of the gap 17 between each pair of the lock member 10 and the guide protrusion 12B, in a direction that causes a portion of the lock teeth 10d adjacent to the shaft member 11 to move into engagement with the gear teeth 7a. This makes it possible to strengthen the engagement between the gear teeth 7a and the lock teeth 10d and lock the seat back 3 in position with improved strength.

Figure 4:
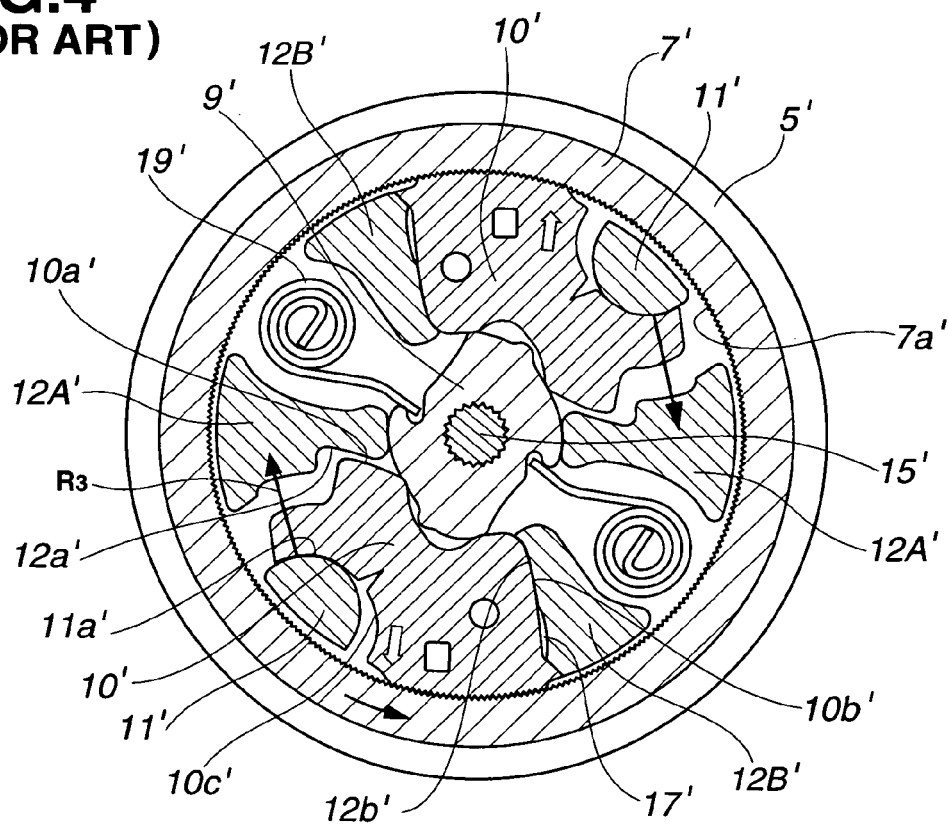
FIG. 4 is a schematic view of a seat reclining device according to the earlier technology.

In the earlier technology, however, the lock members 10' are circumferentially displaced to cause deformation in the contact portions of the lock members 10' and the guide protrusions 12B' and to hang some portions of the lock members 10' (adjacent to their respective first end surfaces) over the shaft surfaces 11a' of the shaft members 11', as shown in FIG. 4, when the rearward load on the seat back 3' becomes increased. The lock members 10' thus receive a large reaction force R3 from the shaft members 11' and undergo large bending stress so that the portions of the lock teeth 10d' adjacent to the shaft members 11' are forced apart from the internal gear teeth 7a. As a result, the shaft bearing surfaces 10c' of the lock members 10' get ruptured to maintain the engagement between the gear teeth 7a' and the lock teeth 10d' in the earlier technology. In addition, the shaft members 11' may interfere with the action of the bending moment developed by the presence of the gaps 17' to move the portions of the lock teeth 10d' adjacent to the shaft members 11' into engagement with the gear teeth 7a'.

In the present embodiment, by contrast, each of the protrusions 11b gets deformed or crushed in the circumferential direction of the pivot member 7, as shown in FIG. 3, so as to absorb stress when the lock members 10 are circumferentially displaced relative to the shaft members 11 under the application of a large rearward load on the seat back 3. The lock members 10 can be prevented from hanging over the shaft surfaces 11a of the shaft members 11b since the gaps 18 are left between the lock members 10 and the shaft members 11 at locations adjacent to the protrusions 11b. The lock members 10 thus receive a smaller reaction force R3 and undergo smaller bending stress in the present embodiment. Further, the direction of stress on the lock members 10 substantially agrees with the circumferential direction of the pivot member 7. It is accordingly possible in the present embodiment to prevent ruptures of the lock members 10, reduce the force that causes the portions of the lock teeth 10d adjacent to the shaft members 11 to move apart from the gear teeth 7a and maintain stable engagement between the gear teeth 7a and the lock teeth 10d. Furthermore, the shaft members 11 can be prevented, in the presence of the gaps 18, from interfering with the action of the bending moment developed by the presence of the gaps 17 to move the portions of the lock teeth 10d adjacent to the shaft members 11 into engagement with the gear teeth 7a. It is thus possible in the present embodiment to further increase the strength of engagement between the gear teeth 7a and the lock teeth 10d.

In this way, the strength of the seat reclining device 1 is stabilized and improved so that the seat reclining device 1 is able to hold the seat back 3 at a desired angle with respect to the seat cushion 2 assuredly even when a large load is applied to the seat back 3.

The entire contents of Japanese Patent Application No. 2005-064743 (filed on Mar. 9, 2005) are herein incorporated by reference.

Although the present invention has been described with reference to one specific embodiment of the invention, the invention is not limited to the above-described embodiment. Various modification and variation of the embodiment described above will occur to those skilled in the art in light of the above teaching. For example, the seat reclining device 1 may alternatively be designed to allow the pivot member 7 to move in the counterclockwise direction in FIG. 3 relative to the base member 5 when a load is applied to the seat back 3 in a direction that tilts the seat back 3 toward the vehicle rear side although the pivotal movement of the pivot member 7 in the counterclockwise in FIG. 3 relative to the base member 5 is allowed under the application of a rearward load to the seat back 3 in the above embodiment. The scope of the invention is defined with reference to the following claims.

What is claimed is:

1. An automotive seat reclining device for holding a seat back at a desired angle with respect to a seat cushion, comprising:
    a base member coupled to one of the seat cushion and the seat back;
    a pivot member coupled to the other of the seat cushion and the seat back, being pivotable relative to the base member and having gear teeth;
    a shaft member integrally formed with the base member;
    a lock member being swingable around the shaft member and having a shaft bearing surface and lock teeth engageable with the gear teeth;
    a cam member for causing the lock member to swing along an arc path around the shaft member in a direction that brings the lock teeth into engagement with the gear teeth to prevent a pivotal movement of the pivot member relative to the base member and in a direction that disengages the lock teeth from the gear teeth to allow a pivotal movement of the pivot member relative to the base member; and
    first and second guide members formed integrally with the base member at locations adjacent to respective ends of the swing path of the lock member so as to guide the lock member along the swing path and, under the application of a load that forces the pivot member to pivot relative to the base member, support the lock member by the shaft member and the second guide member,
    wherein the shaft member has a shaft surface facing the shaft bearing surface of the lock member and including a pair of shaft surface sections to guide the lock member along the swing path and a stress absorbing protrusion formed integrally with one of the shaft surface sections located on an opposite side of the shaft member from the lock teeth.

2. The automotive seat reclining device according to claim 1, wherein there is a gap left between the shaft bearing surface of the lock member and the shaft surface of the shaft member at a location between the stress absorbing protrusion and the other of the shaft surface sections.

3. The automotive seat reclining device according to claim 2, wherein the gap becomes wider as the distance from the stress absorbing protrusion decreases.

4. The automotive seat reclining device according to claim 1, wherein there is a gap left between portions of the lock member and the second guide member facing each other at a location adjacent to the gear teeth.

5. An automotive seat reclining device for holding a seat back at a desired angle with respect to a seat cushion, comprising:
    a base member coupled to one of the seat cushion and the seat back;
    a pivot member coupled to the other of seat cushion and the seat back, being pivotable relative to the base member and having gear teeth;
    a shaft member formed integrally with the base member and having a cylindrical shaft surface;
    a lock member being swingable along a path around the shaft member and having a shaft bearing surface facing the shaft surface, a pair of first and second opposite end surfaces positioned on the swing path of the lock member and lock teeth formed in the second end surface to be engageable with the gear teeth;
    a cam member for causing the lock member to swing along the path around the shaft member in a direction that brings the lock teeth into engagement with the gear teeth to prevent a pivotal movement of the pivot member relative to the base member and in a direction that disengages the lock teeth from the gear teeth to allow a pivotal movement of the pivot member relative to the base member;
    first and second guide members formed integrally with the base member at locations adjacent to the first and second end surfaces of the lock member, respectively, so as to guide the lock member along the path around the shaft member; and
    a stress absorbing protrusion formed integrally with the shaft surface on an opposite side of the shaft member from the lock teeth.

6. The automotive seat reclining device according to claim 5, wherein the shaft surface includes a shaft surface section positioned adjacent to the second end surface of the lock member to make sliding contact with the shaft bearing surface of the lock member and the stress absorbing protrusion has an end to make sliding contact with the shaft bearing surface of the lock member.

7. The automotive seat reclining device according to claim 6, wherein there is a gap left between the shaft bearing surface of the lock member and the shaft surface of the shaft member at a location between the protrusion and the shaft surface section.

8. The automotive seat reclining device according to claim 7, wherein the gap becomes wider as the distance from the protrusion decreases.

9. The automotive seat reclining device according to claim 5, wherein there is a gap left between portions the lock member and the second guide member facing each other at a location adjacent to the gear teeth.

* * * * *